(12) United States Patent
Bonola

(10) Patent No.: US 6,480,919 B2
(45) Date of Patent: *Nov. 12, 2002

(54) METHOD AND APPARATUS FOR PROVIDING SEAMLESS HOOKING AND INTERCEPTING OF SELECTED KERNEL AND HAL EXPORTED ENTRY POINTS

(75) Inventor: Thomas J. Bonola, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/788,899

(22) Filed: Feb. 20, 2001

(65) Prior Publication Data

US 2001/0009020 A1 Jul. 19, 2001

Related U.S. Application Data

(63) Continuation of application No. 09/152,597, filed on Sep. 14, 1998, now Pat. No. 6,275,893.

(51) Int. Cl.[7] .............................................. G06F 13/24
(52) U.S. Cl. ........................ 710/262; 710/305; 710/16
(58) Field of Search ............................... 710/260–262, 710/264–269, 129, 131, 15–16; 709/249, 227, 232, 102–104; 712/28–31

(56) References Cited

U.S. PATENT DOCUMENTS

| | | | | |
|---|---|---|---|---|
| 4,547,849 A | 10/1985 | Louie et al. | ................. | 710/129 |
| 5,113,523 A | 5/1992 | Colley et al. | .................. | 712/1 |
| 5,170,471 A | 12/1992 | Bonevento et al. | ............ | 710/1 |
| 5,339,426 A * | 8/1994 | Aoshima | ..................... | 710/12 |
| 5,369,770 A | 11/1994 | Thomason et al. | ......... | 710/200 |
| 5,594,905 A | 1/1997 | Mital | ......................... | 710/260 |
| 5,694,606 A * | 12/1997 | Pletcher et al. | ............. | 710/261 |
| 5,752,032 A | 5/1998 | Keller et al. | ................... | 709/5 |
| 5,758,184 A | 5/1998 | Lucovsky et al. | ............. | 710/6 |
| 5,778,226 A | 7/1998 | Adams et al. | .............. | 709/301 |
| 5,802,124 A | 9/1998 | Bhadsavle | ................... | 375/377 |
| 5,887,169 A | 3/1999 | Lacombe | ....................... | 709/5 |
| 5,899,987 A | 5/1999 | Yarom | ........................... | 707/3 |
| 5,956,507 A | 9/1999 | Shearer, Jr. et al. | ............ | 709/5 |
| 5,956,710 A * | 9/1999 | Yarom | ........................... | 707/3 |
| 5,964,853 A | 10/1999 | Falik et al. | ................... | 710/73 |
| 6,275,893 B1 * | 8/2001 | Bonola | ....................... | 710/262 |

OTHER PUBLICATIONS

Mendel, Brett; Server I/O all set to flow:; *Lantimes*, Oct. 27, 1997, vol. 14, Issue 22; cover page and p. 31.

(List continued on next page.)

*Primary Examiner*—Peter Wong
*Assistant Examiner*—Raymond N Phan
(74) *Attorney, Agent, or Firm*—Fletcher, Yoder & Van Someren

(57) ABSTRACT

In a computer system having at least one host processor, a method and apparatus for providing seamless hooking and interception of selected entrypoints includes finding the IDT for each CPU which can include scanning the HAL image for the HAL PCR list. Saving the interrupt handler currently mapped in the CPU's interrupt descriptor table. Patching the original interrupt into the new interrupt handler. Storing the new interrupt exception into the CPU's interrupt descriptor table. Hooking a select entrypoint by first determining if the entrypoint begins with a one byte instruction code. If it does, saving the address of the original entrypoint, saving the original first one byte instruction, and patching the new interrupt intercept routine to jump to the original entrypoint's next instruction.

27 Claims, 4 Drawing Sheets

OTHER PUBLICATIONS

Briggs, Chris; Smarter and Faster I/O for Servers:; CORE: Operating Systems; *Byte*, May 1, 1997, vol. 2, No. 5.

Thompson, Tom; "I$_2$O Beats I/O Bottlenecks'" *Byte*. Aug. 1997, pp. 85, 86 and 3 additional pages.

I$_2$O Introduction; Technology Backgrounder; Aug. 13, 1997; http://www.i2osig.org/Architecture.TechBackk.html.

i960®RP I/O Processor—the I$_2$O SIG site; http://134.134.214.1/design/iio/i2osig.html; Feb. 6, 1998.

"Welcome to the I$_2$O SIG® Web Site!"; http://www.i2osig.org; Feb. 6, 1998.

"About I$_2$O Technology"; http://www.i2osig.org/Architecture; Feb. 6, 1998

Technology Backgrounder:; http://www.i2osig.org.Architecture.TechBack.html; Feb. 6, 1998; 6 pages.

"Questions and Answers"; http://www.i2osig.org/Architecture.QandA.html; Feb. 6, 1998; 4 pages.

I$_2$O® Specifications for Non–Members; http://www.i2osig.org/Architecture/GetSpec.html; Feb. 6, 1998.

Amdahl, Carlton G.; "I$_2$O Future Directions"; http://i2osig.org; Jun. 1996; 12 pages.

Globe, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases; http://altavista.digital.com/cgibin/quer . . . =21%2Fmae%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to I$_2$O Standard With New I$_2$O Disk–array Controller"; *Hewlett Packard*; Press Release, Atlanta, Oct. 8, 1997; http://hpcc920.external.hp.com/pressrel/oct97/08oct97b.html; Feb. 6, 1998; 2 pages.

"I$_2$O Disaster in the making for the freeware community"; http://22.kenandted.com/i2o/disaster.html; Feb. 6, 1998; 2 pages.

* cited by examiner

METHOD AND APPARATUS FOR PROVIDING SEAMLESS HOOKING AND INTERCEPTING OF SELECTED KERNEL AND HAL EXPORTED ENTRY POINTS

This application is a Continuation of application Ser. No. 09/152,597 filed Sep. 14, 1998, now U.S. Pat. No. 6,275,895.

FIELD OF INVENTION

The present invention relates to computer systems, and more particularly, but not by way of limitation, to a method and apparatus for providing seamless hooking and interception of selected entrypoints of an operating system, such as entrypoints of either the kernel or the hardware abstraction layer.

BACKGROUND OF THE INVENTION

One of the key factors in the performance of a computer system is the speed at which the central processing unit (CPU) operates. Generally, the faster the CPU operates, the faster the computer system can complete a designated task. Another method of increasing the speed of a computer system is through the use of multiple CPUs. This is commonly known as multiprocessing. With multiple CPUs, algorithms required to complete a task can be executed substantially in parallel as opposed to their sequential execution, thereby decreasing the total time to complete the task.

However, as CPUs are dependent upon peripherals for providing data to the CPU and storing the processed data from the CPU, when a CPU needs to read or write to a peripheral, the CPU is diverted from a current algorithm to execute the read/write transaction. As can be appreciated, the length of time that the CPU is diverted is typically dependent upon the speed of the I/O transaction.

One advancement developed to increase the efficiency of I/O transactions is the intelligent input/output ($I_2O$) architecture. In the $I_2O$ approach to I/O, low-level interrupts are off loaded from a CPU to I/O processors (IOPs). The IOPs are additional processors that specifically handle I/O. With support for message-passing between multiple independent processors, thet $I_2O$ architecture relieves the host processor of interruptintensive I/O tasks, greatly improving I/O performance especially in high-bandwidth applications such as networked video, groupware, and client/server processing.

Typical $I_2O$ architectures use a "split driver" model which inserts a messaging layer between the portion of the device driver specific to the operating system and the portion of the device driver specific to the peripheral. The messaging layer splits the single device driver of today into two separate modules, an Operating System Service Module (OSM), and a Downloadable Driver Module (DDM). The only interaction one module has with another module is through this messaging layer.

The OSM comprises the portion of the device driver which is specific to the operating system. The OSM interfaces with the operating system of the computer system (which is commonly referred to in the art as the "host operating system") and is executed by the CPU. Typically, a single OSM may be used to service a specific class of peripherals. For example, one OSM would be used to service all block storage devices, such as hard disk drives, and CD-ROM drives.

The DDM provides the peripheral-specific portion of the device driver that understands how to interface to the particular peripheral hardware. To execute the DDM, an IOP is added to the computer system. A single IOP may be associated with multiple peripherals, each controlled by a particular DDM, and contains its own operating system such as, for example, the $I_2O$ Real-Time Operating System (iRTOS). The DDM directly controls the peripheral, and is executed by the IOP under the management of the IRTOS.

In general operation, the communications model used in the $I_2O$ architecture is a message passing system. When the CPU seeks to read or write to a peripheral in an $I_2O$ system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending a message through the messaging layer. It can be appreciated that to the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecking is mitigated. Accordingly, any performance gains to be achieved by adding an additional or faster CPU to the computer system may be unhindered by the I/O processing bottleneck.

There are three common approaches to implement the $I_2O$ architecture. The first is an IOP installed on the motherboard of the computer system. In this approach, the IOP is installed directly on the motherboard and is used for $I_2O$ processing. In this particular configuration, the IOP is often used as a standard PCI bridge, and can also be used to bring intelligence to the PCI bus.

The second approach is to include an IOP on adapter cards, such that with an IOP on an adapter card, IT managers can add intelligent I/O to the computer system by adding an additional adapter.

The third approach is to install the IOP in the computer system via an optional plug-in card. This allows systems to be populated with one IOP per host adapter plugged into a slot instead of on the motherboard.

Although the intent of 20 was the implementation of portable, high-performance intelligent I/O systems there exists a number of problems with $I_2O$ architecture. As is often the case, one problem is cost. The inclusion or the addition of additional hardware and extra processors (the IOPs) to a computer system will ultimately raise the price of the system.

Another problem arises as a result of the direction the computer industry has taken in the adoption of an IOP "standard". Currently, the computer industry is pushing to adopt the Intel i960 processor for the industry standard $I_2O$ IOP. Some of the problems with the i960 include computing and speed problems, especially when the i960 is compared to other existing processors on the market.

In a multiprocessor system environment one proposed solution to the i960 IOP is to use software to solely dedicate at least one of the host processors to controlling the I/O. As can be appreciated, current system processors have very superior computing power and speed as compared with the i960. Another advantage of a host processor IOP is that no additional hardware needs to be purchased or added. This is especially true when upgrading an existing computer system to be $I_2O$ compliant. However, in making a computer system $I_2O$ compliant by dedicating a host processor, many problems have been encountered. One problem is making the dedicated host processor appear to the rest of the computer system to be an $I_2O$ IOP in a seamless manner. It is desired that a computer system having a host processor IOP appear to a user to be a typical $I_2O$ compliant computer system in all aspects including software interaction and hardware interaction.

Many existing computer systems utilize kernel based operating systems. In a kernel based operating system, such as Windows NT, the operating system has a layered architecture. In this type of operating system, the kernel is at the core of the layered architecture and manages only basic operating system functions. The kernel is responsible for thread dispatching, multiprocessor synchronization, and hardware exception handling.

Another piece of software often associated with the operating system is the hardware abstraction layer (HAL). The HAL is an isolation layer of software that hides, or abstracts hardware differences from higher layers of the operating systems. Because of the HAL, the different types of hardware all look alike to the operating system, removing the need to specifically tailor the operating system to the hardware with which it communicates. Ideally, the HAL provides routines that allow a single device driver to support the same device on all platforms.

HAL routines can be called from both the base operating system, including the kernel, and from device drivers. The HAL enables device drivers to support a wide variety of I/O architectures without having to be extensively modified. The HAL is also responsible for hiding the details of symmetric multiprocessing hardware from the rest of the operating system.

In the early days of Windows NT, it was common practice for the hardware OEMs to be responsible for providing the HAL software for their particular hardware to the manufacturer of the operating system. As multiprocessing systems became more commonplace, there was a shift from the hardware OEMs supplying the HAL routines, to the OS manufacturer supplying the HAL routines for all the hardware OEMs.

Therefore, as can be further appreciated, when making of a computer system $I_2O$ compliant by dedicating at least one of the host processors for an IOP, it is not practical to modify an existing operating system or HAL. Rather it would be more advantageous to provide "routines" that are seamlessly hooked into the operating system

SUMMARY OF THE INVENTION

The present invention overcomes the above identified problems as well as other shortcomings and deficiencies of existing technologies by providing a method and apparatus for seamless hooking and interception of selected entrypoints of an operating system, such as entrypoints of either the kernel or the hardware abstraction layer.

The present invention further provides, in a computer system having at least one host processor, a method and apparatus for providing seamless hooking and interception of selected entrypoints by first scanning the HAL image for the HAL PCR list, whereupon the interrupt handler currently mapped in the CPU's interrupt descriptor table is then saved. The original interrupt is then patched into a new interrupt handler. Then the new interrupt exception is stored into the CPU's interrupt descriptor table. Subsequent thereto, a select entrypoint is hooked by first determining if the entrypoint begins with a one byte instruction code. If it does, the address of the original entrypoint is saved. The new interrupt intercept routine is then patched to jump to the original entrypoint's next instruction for selected conditions.

BRIEF DESCRIPTION OF THE DRAWINGS

A more complete understanding of the present invention may be had by reference to the following Detailed Description and appended claims when taking in conjunction with the accompanying Drawings wherein:

DETAILED DESCRIPTION

With reference to FIGS. 1, 2, 3, 4 and 5 there are shown block diagrams illustrating an exemplary embodiment of the present invention. The purpose of these block diagrams is to illustrate, among other things, the features of the present invention and the basic principles of operation thereof These block diagrams are not necessarily intended to schematically represent particular modules of circuitry or control paths.

Figure 1:
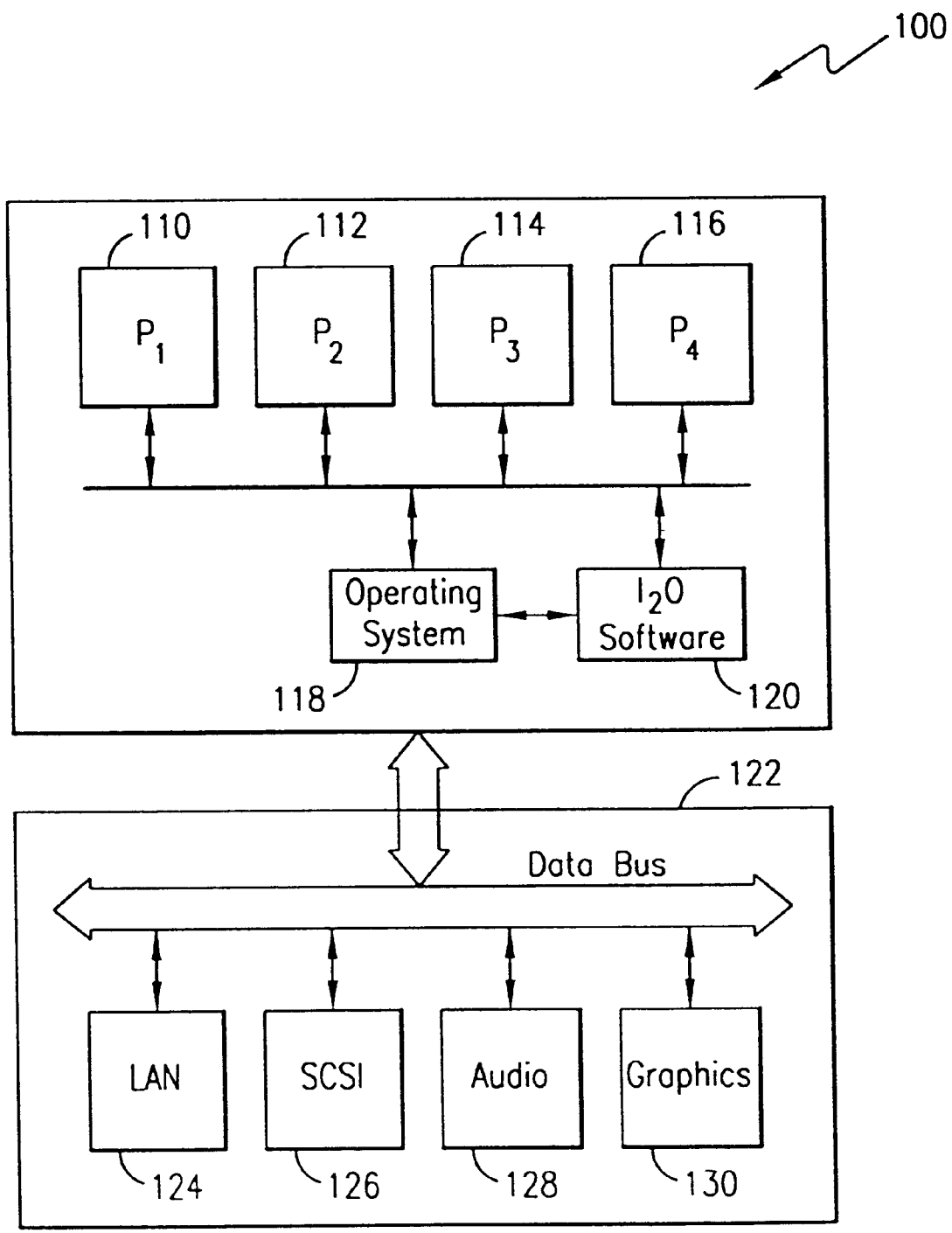
FIG. 1 is a schematic block diagram of a computer system utilizing the present invention.

Referring now to FIG. 1, there is illustrated a schematic block diagram of a computer system 100. As illustrated, computer system 100 is a multiprocessor system and contains the following: multiple host processors 110, 112, 114 and 116; module 118 which contains the operating system-module $I_2O$ which contains $I_2O$ software; and associated hardware 122. As depicted, the associated hardware 122 includes items such as a LAN controller 124, SCSI controller 126, audio controller 128, and graphics controller 130.

As computer system 100 is a multiprocessing computer, it is able to execute multiple threads simultaneously, one for each of the processors therein. Further it is contemplated that the processors in computer system 100 can operate either asymmetrically, symmetrically, or in a combination thereof Although the present invention is illustrated in a computer system having four host processors, it is contemplated that the present invention could also be utilized in a computer system with virtually any number of host processors, including, but not limited to a single host processor.

In this particular embodiment of computer system 100, the $I_2O$ software of module $I_2O$ is utilized to dedicate one or more of the processors (such as processor 116) for use as a input/output processor (IOP) such that computer system 100 is an $I_2O$ compliant computer system.

Figure 2:
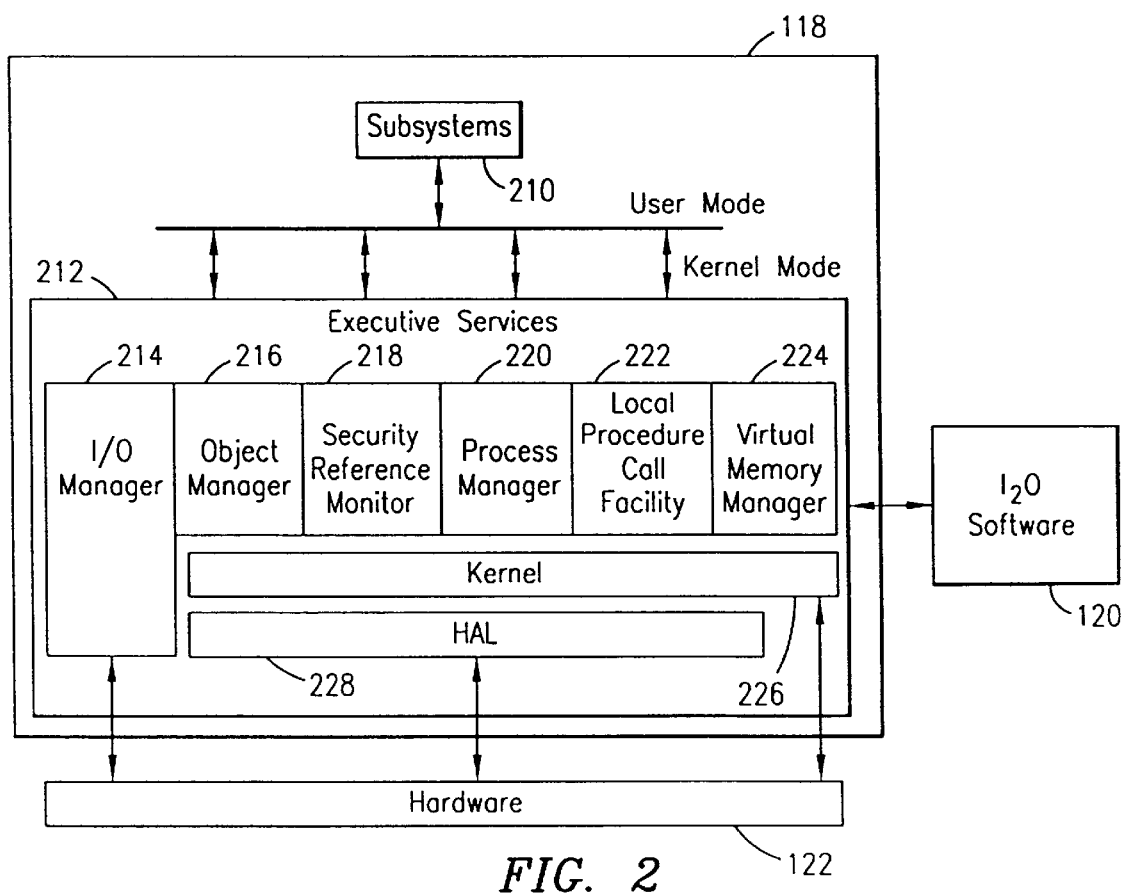
FIG. 2 is a schematic diagram of an exemplary embodiment of an operating system in accordance with the principles of the present invention.

Referring now to FIG. 2, there is illustrated a more detailed block diagram of an exemplary architecture for operating system 118. As depicted the architecture of operating system 118 is a kernel based operating system. Operating system 118 includes subsystems 210 (which operate in user mode), and system or executive services 212 (which operate in kernel mode). Executive services 212 are made up of multiple components, such as the I/O manager 214, the object manager, the security reference monitor 218, the process manager 220, the local procedure call facility 222, the virtual memory manager, 224, the kernel 226, and the hardware abstraction layer (HAL) 228. The components that make up the executive services provide basic operating system services to subsystems 210 and to each other. The components are generally completely independent of one another and communicate through controlled interfaces.

Still referring to FIG. 2, the I/O manager 214 manages all input and output for the operating system including the managing of the communications between drivers of computer system 100. Object manger 216 is for creating, managing, and deleting executive objects. Security reference monitor 218 is utilized to ensure proper authorization before allowing access to system resources such as memory, I/O devices, files and directories. Process manager 220 manages the creation and deletion of processes by providing a standard set of services for creating and using threads and processes in the context of a particular subsystem environment. Local procedure call facility 222 is a message-passing mechanism for controlling communication between the client and server when they are on the same machine. Virtual memory manager 224 maps virtual addresses in the process' address space to physical pages in the computer's memory.

Still referring to FIG. 2, kernel 226 is the core of the architecture of operating system 118 and manages the most basic of the operating system functions. It is responsible for thread dispatching, multiprocessor synchronization, and hardware exception handling.

Still referring to FIG. 2, in this particular embodiment applications utilized in computer system 100 are kept separate from the operating system 118 itself Operating system 118 runs in a privileged processor mode known as kernel-mode and has access to system data and hardware. Applications run in a nonprivileged processor mode known as user mode and have limited access to system data and hardware through a set of tightly controlled application programming interfaces (APIs) or entrypoints.

In this exemplary embodiment, good results have also been achieved in the present invention by using a microkernel-based operating system for operating system 118. In a microkernel-based operating system, only the functions that can not be reasonably performed elsewhere remain in the kernel. The functionalities that are removed from the standard kernel are put in subsystems 210. Subsystems 210 provide the traditional operating system support to applications through a set of APIs.

Hardware abstraction layer (HAL) 228 is an isolation layer of software that hides, or abstracts hardware differences from higher layers of the operating system. Through the utilization of HAL 228, the different types of hardware all "look" alike to the operating system. The HAL 228 removes the need to specifically tailor the operating system to the hardware with which it communicates. Routines of HAL 228 can be called from both the base operating system (including the kernel) and from the device drivers.

In this exemplary computer system, the processors 110-116 provide two mechanisms for interrupting program execution: interrupts and exceptions. An interrupt is an asynchronous event that is typically triggered by an I/O device. An exception is a synchronous event that is generated when the processor detects one or more predefined conditions while executing an instruction.

Interrupts are forced transfers of execution from the currently running program or task of a processor to a special procedure to task called an interrupt handler. Interrupts typically occur at random times during the execution of a program, in response to signals from hardware. They are used to handle events external to the processor, such as requests to service peripheral devices. Software can also generate interrupts by executing the INT n instruction.

Generally a processor's interrupt handling mechanism allows interrupts to be handled transparently to application programs and the operating system or executive. When an interrupt is signaled, the processor halts execution of the current program or task and switches to an interrupt handler procedure that is written specifically to handle the interrupt condition. The processor accesses the interrupt handler procedure through an entry in the interrupt descriptor table (IDT).

When execution of the interrupt handler is complete, the processor resumes execution of the interrupted procedure or task. The resumption of the interrupted procedure or task happens without loss of program continuity, unless the interrupt caused the currently running program to be terminated.

As described hereinabove, a processor can receive interrupts from two sources. The first is from external (hardware generated) interrupts. External interrupts are generally received through pins on the processor or through the local APIC serial bus.

The second source of interrupts is from software-generated interrupts. A very common software-generated interrupt is the INT n instruction. The INT n instruction generates a call to the interrupt or exception handler specified with the destination operand. The destination operand specifies an interrupt vector number. The interrupt vector number specifies an interrupt descriptor in the interrupt descriptor table (IDT), i.e., it provides index into the IDT. The selected interrupt descriptor in turn contains a pointer to an interrupt or exception handler procedure.

A particular call to interrupt procedure is the Int03. The Int03 instruction generates a special one byte opcode (CC) that is intended for calling the debug exception handler. This one byte form for Int03 is valuable because it can be used to replace the first byte of any instruction with a breakpoint, including other one-byte instructions, without over-writing other code.

Figure 3:
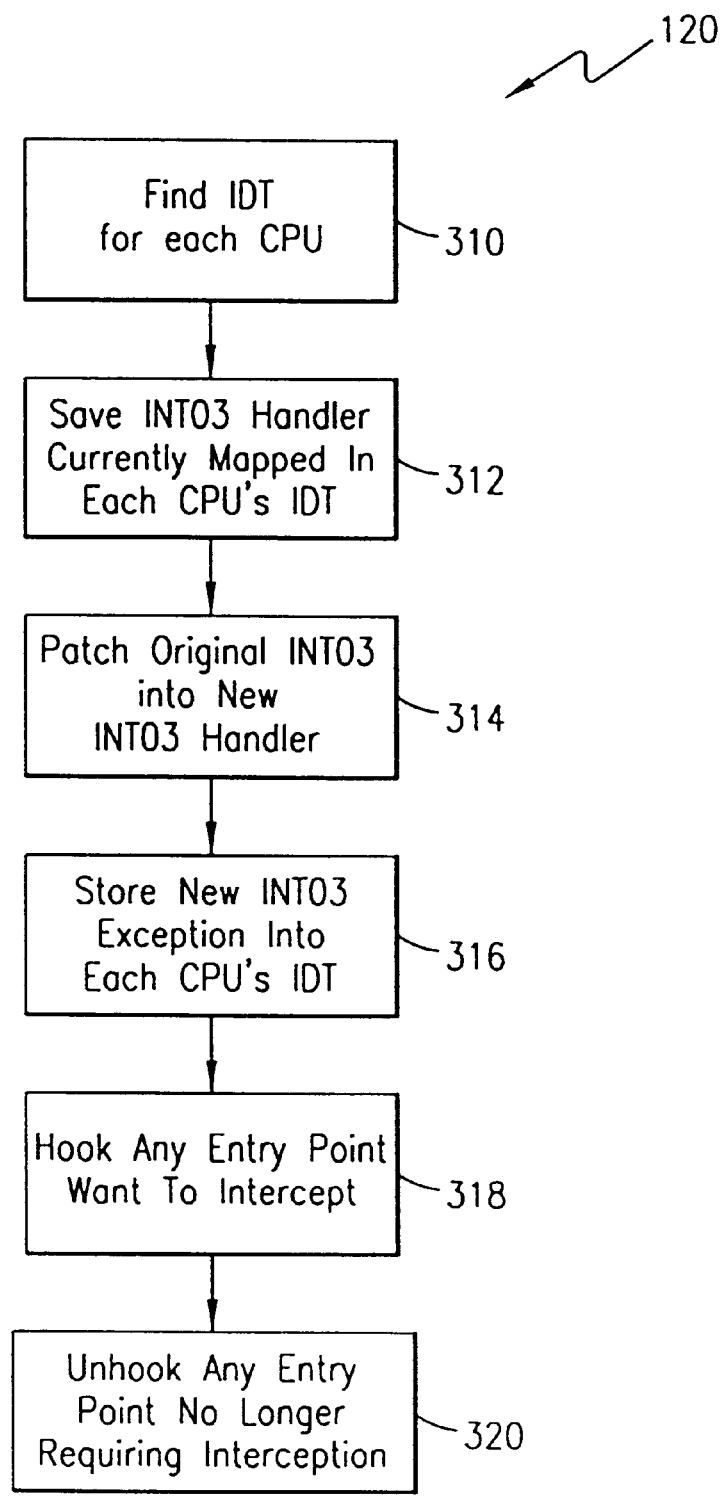
FIG. 3 is a block flow diagram illustrating an exemplary embodiment of a routine or method for seamlessly hooking and intercepting selected exported entrypoints without the need to provide a modified kernel or HAL.

Referring now to FIG. 3, there is illustrated a block flow diagram 300 illustrating a routine or method for seamlessly hooking and unhooking selected exported entrypoints without the need to provide a special kernel or HAL. This is performed so that an alternative routine can be selectively substituted for the selected entrypoint routines. Although illustrated as part of the I₂O software, it is contemplated that the present invention is not limited to this type of software, rather could be utilized in virtually any type of software or hardware.

As depicted by block 3 10, the IDT for each CPU is found. This step could include scanning the HAL image for each of the processors in the computer system for the table of system processor control registers (PCRs). There is generally one PCR per processor in the computer system 100. Subsequent thereto, as indicated by block 312, the original Int03 handler mapped in each CPU's IDT entry 3 is saved, this includes saving the contents of the original Int03 vector information. Then, as indicated by block 314, the original Int03 handler code is patched into the new Int03 handler code. This is performed so that a direct jump can be made to the original Int03 handler code if the exception is not for interception.

Then, as indicated by block 316, the new Int03 vector information is loaded into the IDT of each of the processors. This code is responsible for intercepting Int03 exceptions and dispatching the new Int03 exceptions to a corresponding new routine. Any Int03's not created by the new routine will be forwarded to the original dispatch handler provided by the operating system.

Then, as indicated by block 318, the selected entrypoints, from either the HAL or kernel are hooked. Generally, blocks 310–318 are performed during the initialization sequence of the computer system. An exemplary hooking routine is given in detail hereinbelow with reference to FIG. 4.

Still referring to FIG. 3, as indicated by block 320, entrypoints no longer requiring interception are then unhooked. An example of when this occurs is at a select time after the initialization sequence, certain entrypoints may no longer be needed whereby these entrypoints should operate in a "normal" routine, thus the unneeded entrypoints are unhooked.

Figure 4:
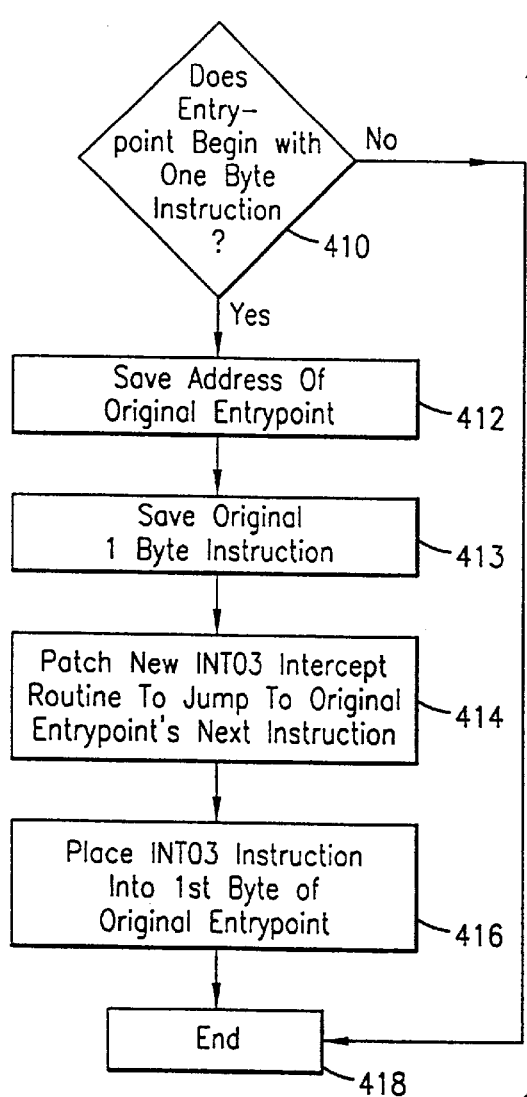
FIG. 4 is a block flow diagram illustrating an exemplary embodiment of a hook routine in accordance with the principles of the present invention.

Referring now to FIG. 4, there is illustrated a block diagram 400 illustrating an exemplary embodiment of a hooking routine in accordance with the principles of the present invention.

As depicted in block 410, a determination is first made whether a selected entrypoint begins with a one byte instruction. If it does not begin with a one byte instruction, the "no" branch is followed to block 418 where the routine ends without hooking the selected entrypoint.

If the determination is made that the entrypoint begins with a one byte instruction, the "yes" branch is followed to block 412. The address of the original entrypoint are saved in the data structure of the new or substitute routine. As indicated by block 413, the original 1 byte instruction is then saved into the new Int03 intercept routine. Then, as indicated by block 414, the new Int03 intercept routine is patched to jump to the original entrypoint's next instruction. This is done for instances when the encountered Int03 is not the new Int03.

Then, as indicated by block 416, the first byte of the original entrypoint is replaced by an Int03 instruction. This is performed, such that all callers of this particular entrypoint will cause an Int03 exception to occur and vector to the new driver's INT03 handler.

Figure 5:
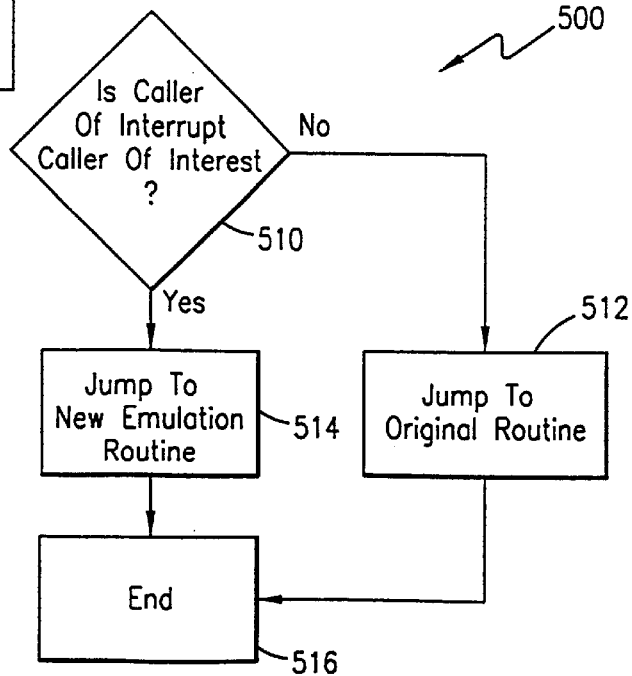
FIG. 5 is a block flow diagram illustrating an exemplary embodiment of how a hooked entrypoint is handled in accordance with the principles of the present invention when a select interrupt exception occurs.

Referring now to FIG. 5, there is illustrated a block flow diagram 500 of an exemplary embodiment of how the hooked entrypoint is handled in accordance with the principles of the present invention when an INT03 exception occurs. Because the first byte location of the hooked entrypoint is the INT03, the INT03 exception is executed by all callers of the entrypoint. As depicted by block 510 whenever an INT03 is encountered, a determination is made as to the caller or origin of the interrupt. If the determination is made that the caller of the interrupt is not a caller of interest for the particular new routine, then the "no" branch is followed to block 512, where the routine jumps back to the original routine for the caller of the interrupt. If the determination is made that the caller of the interrupt is a caller of interest for the particular new routine, the "yes" branch is followed to block 514, where a jump is made to the new routine.

Therefore, as can be appreciated by one of ordinary skill in the art, the present invention provides, in a computer system having at least one host processor, a method and apparatus for providing seamless hooking and interception of selected entrypoints. The HAL image for the HAL PCR list is scanned, whereupon the interrupt handler currently mapped in the CPU's interrupt descriptor table is saved. The original interrupt is then patched to the new interrupt handler. Then the new interrupt exception is stored into the CPUs interrupt descriptor table. A select entrypoint is hooked by first determining if the entrypoint begins with a one byte instruction code. If it does, the address of the original entrypoint is saved. The new interrupt intercept routine is patched to jump to the original entrypoint's next instruction for selected conditions.

Although a preferred embodiment of the present invention has been illustrated in the accompanying Drawings and described in the foregoing Detailed Description, it will be understood that he invention is not limited to the embodiment disclosed, but is capable of numerous rearrangements, modifications and substitutions without departing from the spirit of the invention as set forth and defined by the following claims.

I claim:

1. A computer system comprising:

at least one processor;

an operating system having at least one entrypoint; and a module for hooking the at least one entrypoint, the module further for executing a routine subsequent to hooking the at least one entrypoint in response to a call to the at least one entrypoint;

the module fuirther for determining an origin of the call and selectively executing the routine based on the determination of the origin; and the module further for determining if the at least one entrypoint begins with a first byte comprising at least one byte of an instruction, such that if the determination is made that the at least one entrypoint does not begin with the at least one byte of an instruction, the at least one entrypoint is not hooked.

2. The computer system as recited in claim 1, wherein the module for hooking said at least one entrypoint further for placing an interrupt instruction into the first byte of the entrypoint if the determination is made that the at least one entrypoint does begin with the at least one byte of an instruction.

3. A computer system comprising:

at least one host processor;

an operating system comprising a hardware abstraction layer associated therewith, the hardware abstraction layer comprising at least one entrypoint;

a module for determining whether the at least one entrypoint comprises a first byte, the first byte comprising a one byte instruction and, if the at least one entrypoint comprises the instruction, hooking said at least one entrypoint; and the module further for selectively executing a routine subsequent to hooking said at least one entrypoint.

4. The computer system as recited in claim 3, comprising an interrupt descriptor table associated with the at least one host processor, and wherein the module for hooking said at least one entrypoint fuirther for storing a new interrupt exception into the interrupt descriptor table for the at least one host processor.

5. The computer system as recited in claim 4, wherein the module for hooking said at least one entrypoint further for determining if the at least one entrypoint begins with the one byte instruction, such that if the determrnination is made that the at least one entrypoint begins with the one byte instruction, the at least one entrypoint is hooked.

6. The computer system as recited in claim 5, wherein the module for hooking said at least one entrypoint further for placing a new interrupt instruction associated with the new interrupt exception into the first byte of the entrypoint if the determination is made that the at least one entrypoint does begin with the one byte instruction.

7. A computer system comprising:
a processor;
an operating system executable by the processor, the operating system comprising an entrypoint; and
a module in communication with the operating system, the module configured to hook the entrypoint;
wherein the module is configured (i) to determine an origin of a call to the hooked entrypoint, such that a new interrupt routine is selectively executed based on the determined origin and (ii) to determine if the entrypoint begins with a first byte comprising at least one byte of an instruction, such that if the determination is made that the entrypoint does not begin with the instruction, the entrypoint is not hooked.

8. The computer system as recited in claim 7, wherein the module is configured to place an interrupt instruction into the first byte of the entrypoint if the determination is made that the entrypoint does begin with the instruction.

9. The computer system as recited in claim 7, wherein the instruction is a one-byte instruction.

10. A computer system comprising:
a processor;
an operating system executable by the processor, the operating system comprising an entrypoint; and
a module in communication with the operating system, the module configured to hook the entrypoint;
wherein the module is configured (i) to determine an origin of a call to the hooked entrypoint, such that a new interrupt routine is selectively executed based on the determined origin, and (ii) to determine whether the entrypoint comprises a first byte, the first byte comprising a one-byte instruction, and, if so, to hook the at least one entrypoint.

11. The computer system as recited in claim 10 wherein, if the module determines that the entrypoint comprises the one-byte instruction, the module is configured to place an interrupt instruction into the entrypoint.

12. The computer system as recited in claim 11, wherein the entrypoint begins with the first byte, the first byte comprising the one-byte instruction.

13. The computer system as recited in claim 12, wherein the module is to place the interrupt instruction into the first byte of the entrypoint.

14. A computer system comprising:
a processor;
an operating system executable on the processor, the operating system comprising an entrypoint; and
a module in communication with the operating system, the module configured to modify the entrypoint;
wherein the module is configured to determine whether the entrypoint comprises a first byte, the first byte comprising a one-byte instruction, and, if so, to modify the entrypoint.

15. The computer system as recited in claim 14, comprising an interrupt descriptor table associated with the host processor, and wherein the module is configured to store a new interrupt exception into the interrupt descriptor table for the host processor.

16. The computer system as recited in claim 14, wherein the module is configured to determine if the entrypoint begins with the one-byte instruction, such that if the determination is made that the entrypoint begins with the one-byte instruction, the entrypoint is modified.

17. The computer system as recited in claim 15, wherein the module is configured to place a new interrupt instructor associated with the new interrupt exception into the first byte of the entrypoint if the determination is made that the entrypoint comprises the one-byte instruction.

18. The computer system as recited in claim 14, wherein the module is configured to place an interrupt instruction into the entrypoint if the module determines that the entry point comprises the one-byte intruction.

19. The computer system as recited in claim 18, wherein the module replaces the one-byte instruction with the interrupt instruction.

20. The computer system as recited in claim 13, wherein the module is configured to execute a routine in response to a call to the hooked entrypoint, and wherein the module is configured to determine an origin of the call and to selectively execute the routine based on the determined origin.

21. The computer system as recited in claim 13, wherein the operating system comprises a hardware abstraction layer, and the entrypoint comprises a hardware abstraction layer entrypoint.

22. In a computer system comprising a processor and an operating system, the operating system comprising an entrypoint having a logical address, a method of hooking the entrypoint, the method comprising the acts of:
determining if the entrypoint comprises a first byte, the first byte comprising a one-byte instruction,
if so, saving the logical address of the entrypoint; and
placing an interrupt instruction into the entrypoint.

23. The method as recited in claim 22, comprising the acts of determining if the entrypoint begins with the first byte, and, if so, placing the interrupt instruction into the first byte.

24. The method as recited in claim 22, wherein the interrupt instruction is associated with a new interrupt routine for the processor, and the method comprises the acts of:
subsequent to placing the interrupt instruction into the entrypoint, identifying an origin of a call to the entrypoint;
determining if the identified origin comprises an origin of interest; and
if so, executing the new interrupt routine.

25. A tangible medium for storing a routine for hooking an entrypoint in an operating system, the routine being executable by a processor, the tangible medium comprising:
a routine for determining if the entrypoint begins with a first byte, the first byte comprising a one-byte instruction; and
a routine for hooking the entrypoint if the entrypoint begins with the one-byte instruction.

26. The tangible medium as recited in claim 25, comprising:
a routine for identifying an origin of a call to the hooked entrypoint; and
a routine for selectively executing a new interrupt routine based on the identified origin of the call.

27. The tangible medium as recited in claim 25, wherein the routine for hooking the entrypoint comprises replacing the first byte of the entrypoint with a new interrupt instruction.

* * * * *

UNITED STATES PATENT AND TRADEMARK OFFICE
CERTIFICATE OF CORRECTION

PATENT NO.    : 6,480,919 B2
DATED         : November 12, 2002
INVENTOR(S)   : Thomas J. Bonola It is certified that error appears in the above-identified patent and that said Letters Patent is hereby corrected as shown below:

<u>Column 8,</u>
Line 28, delete "fuirther" and substitute -- further -- therefor.
Line 65, delete "determnination" and substitute -- determination -- therefor.

Signed and Sealed this

Fourth Day of March, 2003

JAMES E. ROGAN
*Director of the United States Patent and Trademark Office*